(12) United States Patent
Nishihata

(10) Patent No.: US 8,140,638 B2
(45) Date of Patent: Mar. 20, 2012

(54) MULTISTAGE ONLINE TRANSACTION SYSTEM, SERVER, MULTISTAGE ONLINE TRANSACTION PROCESSING METHOD AND PROGRAM

(75) Inventor: Yoshihiko Nishihata, Tokyo (JP)

(73) Assignee: NEC Corporation, Tokyo (JP)

( * ) Notice: Subject to any disclaimer, the term of this patent is extended or adjusted under 35 U.S.C. 154(b) by 147 days.

(21) Appl. No.: 12/767,933

(22) Filed: Apr. 27, 2010

(65) Prior Publication Data

US 2010/0281132 A1 Nov. 4, 2010

(30) Foreign Application Priority Data

Apr. 30, 2009 (JP) ................................. 2009-110788

(51) Int. Cl.
G06F 15/16 (2006.01)
G06F 12/00 (2006.01)

(52) U.S. Cl. ...................................................... 709/213

(58) Field of Classification Search .......... 709/213–218, 709/220, 250
See application file for complete search history.

(56) References Cited

U.S. PATENT DOCUMENTS

| | | | |
|---|---|---|---|
| 7,406,523 B1* | 7/2008 | Kruy et al. | 709/227 |
| 7,689,603 B2* | 3/2010 | Tomida et al. | 707/999.205 |
| 2006/0101081 A1* | 5/2006 | Lin et al. | 707/200 |
| 2007/0143564 A1* | 6/2007 | Uppala | 711/173 |
| 2008/0229020 A1* | 9/2008 | Plamondon | 711/122 |

FOREIGN PATENT DOCUMENTS

| | | |
|---|---|---|
| JP | 6-348740 A | 12/1994 |
| JP | 2006259981 A | 9/2006 |
| JP | 4104281 B | 4/2008 |

* cited by examiner

Primary Examiner — Zarni Maung

(57) ABSTRACT

Provided is a system in which a plurality of nodes including a plurality of servers are connected at least with one NAS shared among the plurality of nodes. At least one of the nodes includes a shared memory from/to which each server belonging to the same node can read and write data. Each of at least two of the servers belonging to the node having the shared memory includes: a node judging device which judges whether output destination of output data obtained by processing the input data is the server belonging to the same node as that of the server itself; a data storage memory acquiring device which secures a storage region of the output data on the shared memory if the output destination is the server belonging to the same node; and a data processor which processes the input data and stores the output data to the storage region.

10 Claims, 10 Drawing Sheets

DATA STORAGE MEMORY ACQUIRING DEVICE 155

DATA OUTPUT DEVICE 156

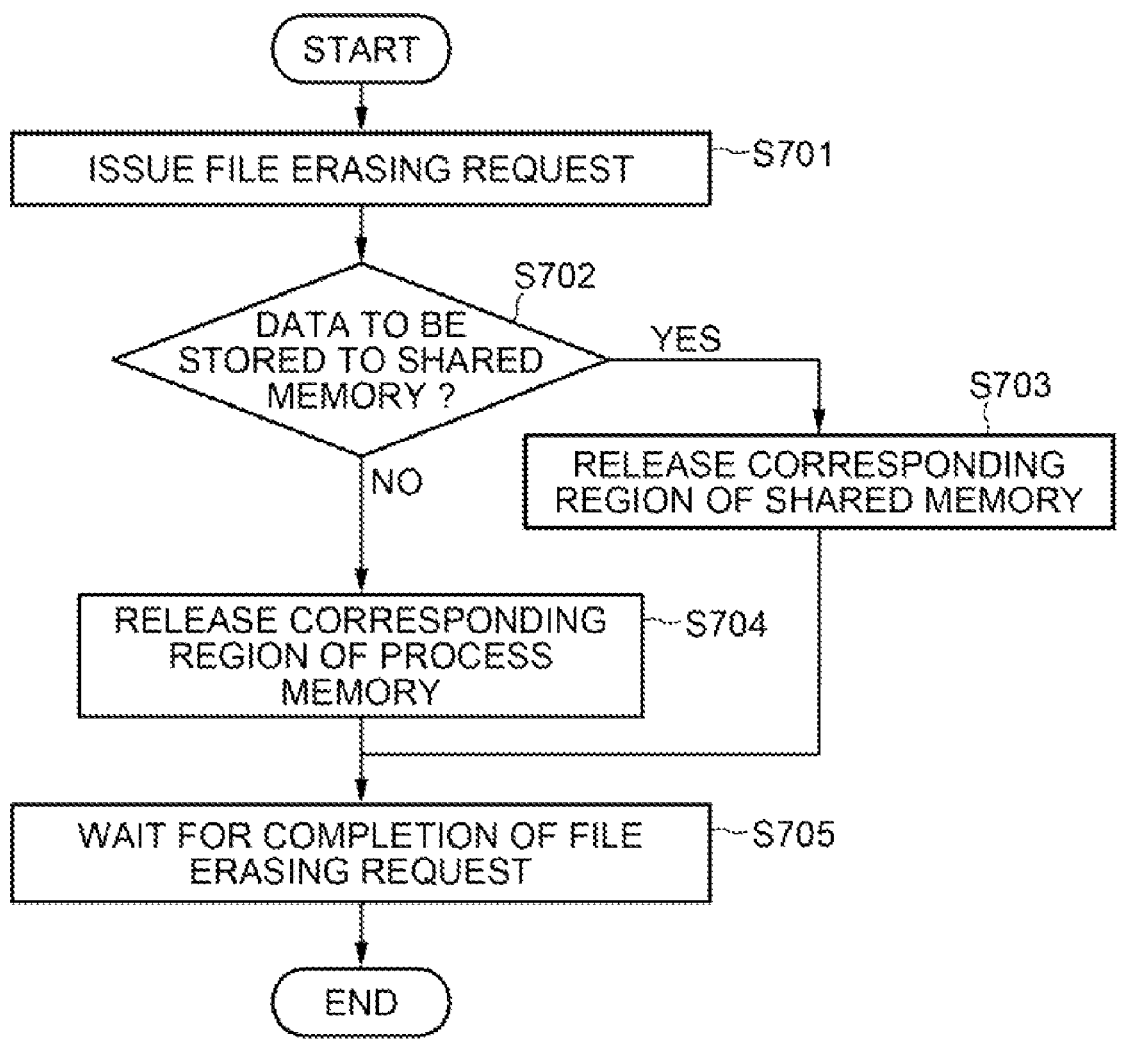

MULTISTAGE ONLINE TRANSACTION SYSTEM, SERVER, MULTISTAGE ONLINE TRANSACTION PROCESSING METHOD AND PROGRAM

CROSS-REFERENCE TO RELATED APPLICATION

This application is based upon and claims the benefit of priority from Japanese patent application No. 2009-110788, filed on Apr. 30, 2009, the disclosure of which is incorporated herein in its entirety by reference.

BACKGROUND OF THE INVENTION

1. Field of the Invention

The present invention relates to an online transaction system and, more specifically, to a technique for overcoming bottleneck of the system and for improving the processing speed.

2. Description of the Related Art

Online transaction systems are frequently used for information systems of strong public nature, such as ATM (Auto Teller Machine) of financial institutions and seat reservation systems for trains. Therefore, it is always desired to achieve both the high reliability and promptness of the processing. Particularly, there must not be occurrence of data loss as well as delay and termination in operating the systems, etc.

FIG. 8 is an explanatory diagram showing an example of the structure of a typical multistage online transaction system 901 which inputs and outputs data in a form of file. The multistage online transaction system 901 is structured by mutually connecting a plurality of nodes which share NAS (Network Attached Storages) 970 and 980 via a network.

As the whole system, a final object thereof is to update a database 960 regarding data inputted from an external data input device 910. Servers (processes) 921-92$n$, 931-932, 941, 951-95$m$ executing intermediate processing not making access to the database 960 record and read out data to/from the files on the NAS 970 and 980 by each transaction. The data recorded to the files on the NAS 970 and 980 is intermediate data for applications which perform different data processing on each of the servers 921-92$n$, 931-932, 941, 951-95$m$, and the files on the NAS 970 and 980 carry out a function of guaranteeing the data when the processing is ceased on a specific server.

The data inputted from the data input device 910 is processed by going through a plurality of nodes 920, 930, 940, 950, and inputted to the database 960 at last. Further, the node 920 and the node 930 use the NAS 970 for sharing the data, and the node 930, the node 940, and the node 950 use the NAS 980 for sharing the data.

Each of the nodes is configured with at least one server. In the case shown in FIG. 8, the node 920 is configured with n-pieces of servers 921-92$n$ (n is a natural number), and the node 950 is configured with m-pieces of servers 951-95$m$ (m is a natural number, m=n or m≠n). In the meantime, the node 930 is configured with two servers 931 and 932, while the node 940 is configured with a single server 941.

There are three kinds of forms in the servers configuring the multistage online transaction systems. Specifically, the server of the first form is a server which functions as an input of the entire system for receiving data from the data input device 910, and this server processes the data inputted from the data input device 910 and outputs the processed data as intermediate data as a file on the NAS 970. In the case shown in FIG. 8, the servers 921-92$n$ configuring the node 920 correspond to this server.

The server of the second form performs processing by reading the data from the file on the NAS 970, and outputs the processed data to another file on the other NAS 980. The servers 931, 932, and 941 configuring the nodes 930 and 940 correspond to this server.

The server of the third form reads the data from the file on the NAS 980, and updates the contents of the database based on that data. The servers 951-95$m$ configuring the node 950 correspond to this server.

As shown in FIG. 8, the server of the first form informs the data information such as the file position and the size of the data outputted on the NAS 970 at the time of committing a transaction to the sever of the second form as the output destination. Similarly, as shown in FIG. 8, the server of the second form informs the data information such as the file positions and the size of the data outputted on the NAS 980 at the time of committing a transaction to the sever of the third form which is the output destination.

The data information becomes a path for reading the files and also is utilized for determining the order and the priority to be the conditions regarding with which of the data a transaction is to be done. The data information is smaller in size compared to the data outputted to the NAS 970 and 980, so that it is normally transmitted directly to the destination server via a network as shown in FIG. 8 without employing a form of file. In FIG. 8, solid zigzag lines show the connecting relation of the network, solid arrows show the flows of data, and dotted-line arrows show the flows of the data information. In practice, the data and the data information are all exchanged via the network. All the arrows are illustrated to distinguish the flows of the data and the flows of the data information as a concept.

FIG. 9 is an explanatory diagram showing the internal structure of the nodes 920-940 shown in FIG. 8. The nodes 920-940 are all typical computer devices, and each of those includes: a CPU (Central Processing Unit) 1000 which executes computer programs; an HDD in which the computer programs executed by the CPU 1000 are stored; a RAM (Random Access Memory) in which the program read from the HDD by the CPU is temporarily stored; and a communication interface which performs communications with other computers and NAS via a telecommunications line.

The servers 921-92$n$, 931-932, 941, and 951-95$m$ are built on software when the CPU 1000 executes the computer programs, as shown in FIG. 9. Each of the servers 921-92$n$, 931-932, 941, and 951-95$m$ includes a data processor 1002, a commit processor 1003, a file access managing section 1004, a file access device 1005, a file input device 1006, a file search device 1007, an input data managing section 1008, a communication processor 1009, a data storage memory acquiring device 1010, a data output device 1011, a file commit device 1012, a data erasing device 1013, and a structure managing section 1014. Further, each of the servers 921-92$n$, 931-932, 941, and 951-95$m$ includes a user application 1001 for executing the processing allotted respectively.

On the RAM, storage regions as process memories (buffers) 1102 are allotted for each server. Each server utilizes an execution queue 1101 which manages the inputted and outputted data in a "first in, first out" manner and a process memory as the buffer 1102 for temporarily storing the data when inputting and outputting the file.

The process memories 931*m*, 932*m*, and 941*m* shown in FIG. 10 correspond to the process memories 1102 which are prepared for the respective servers 931, 932, and 941 shown in FIG. 9.

When processing the data, first, the data processor 1002 calls the user application 1001. The user application 1001 receives input data from the data processor 1002, performs data processing inherent for the application, and gives the output data along with the output destination to the data processor 1002. The data processor 1002 executes the data storage memory acquiring device 1010 to acquire the storage region for storing the data on the process memory 1102, and copies the data to that region. The data output device 1011 outputs an instruction to the file access managing section 1004 for outputting the data stored in the process memory 1102 to the NAS 970 or 980. The file access managing section 1004 outputs the instruction for outputting the file to the NAS 970 or 980 to the execution queue 1101. Each of at least two of the file access devices 1005 monitors the data of the execution cure 1101, and outputs the data to the NAS 970 or 980. The structure managing section 1014 manages the operations of each structural element shown in FIG. 9.

At a stage of determining the outputted data (referred to as "commit"), the commit processor 1003 executes the file commit device 1012 when the user application 1001 completes the processing for all the data. The file commit device 1012 waits for completion of the out of the file to the NAS 980 done by the data output device 1011, commits the file, transfers the data information to the output-destination server, erases the data stored in the region of the processing memory 1102, and releases that region.

When completing the execution of the file commit device 1012 for all the output data, the commit processor 1003 executes the data erasing device 1013 for all the input data to which the processing has been done, erases the unnecessary file of the data stored in the NAS 970 or 980, and releases the region of the process memory 1102 where the unnecessary file is stored.

The communication processor 1009 which has received data information from another server gives the data information to the input data managing section 1008. The input data managing section 1008 schedules the data with which a next transaction is to be done based on the data information, executes the file input device 1006 for the target data, reads the data from the file on a path of the NAS 970 or 980 indicated by the data information, and stores that data to the region secured in the process memory 1102. When all the data as the target of the process is stored in the process memory 1102 by one-time transaction, the input data managing section 1008 gives the storing destinations of all the input data to the data processor 1002, and the data processor starts the above-described transaction from there.

FIG. 10 is an explanatory diagram showing an operation example of the multistage online transaction system 901 shown in FIG. 8-FIG. 9. Here, the data processing is started from a state where data 1 is already being stored in the process memory on the server 931 as the input data of the server 931. The data 1 is outputted from one of the servers 921-92*n* or the server 931 or 941. For explanations' sake, it may be the data outputted from any of those servers.

The server 931 reads the data 1 brought in the process memory as the input, and performs processing thereon (step S1201). The server 931 generates data 2 and data 3 by processing the data 1. Along with the output of the data to the server, the data information of that data is also transmitted to the target server. The server 941 generates data 4 by processing the data, and the server 932 generates data 5 from the received data 3 and data 4.

The server 931 once stores the data 2 and the data 3 on the own process memory 931*m*, and then outputs those to the NAS 980. That is, the server 931 first secures the storage region on the process memory 931*m* for the data 2 (step S1202), outputs the data 2 to that region (step S1203), and outputs the data to the NAS 980 thereafter (step S1204). File output is conducted asynchronously, so that the result thereof is not checked here. Similarly, for the data 3, the server 931 first secures the storage region on the process memory 931*m* (step S1205), stores the data 3 to that region (step S1206), and then outputs the data to the NAS 980 thereafter (step S1207).

When completing the processing of the data 1 and the data 2 as well as the data 3 are outputted to the NAS 980, the server 931 checks the output result. After checking the output result, the server 931 transmits the data information regarding the data 2 and the data 3 to the servers (servers 932 and 941) as the output-destination (steps S1208, S1209), and releases the regions of the data 2 and the data 3 on the process memory (steps S1210, 1211). Further, the server 931 erases the file of the data 1 on the NAS 980 (step S1212), and releases the storage region of the data 1 that has become unnecessary since the processing thereon has been completed (step S1213).

The server 941 receives the data information of the data 2 transmitted from the server 931 in step S1208, and secures the buffer 1102 on the own process memory 941*m* (step S1214). Thereafter, the server 941 reads the data 2 from the NAS 980 (step S1215). The server 941 starts the processing for generating the data 4 by processing the data 2 (Step S1216), secures the storage region for the data 4 on the own process memory 941*m* (step S1217), and in a state where the data 4 is stored in that region (step S1218), outputs the data 4 to the NAS 980 to have it stored (step S1219).

The server 941 checks the output result when outputting the data 4 to the NAS 980. After checking the output result, the server 941 transmits the data information of the data 4 to the server 932 (step S1220), releases the region of the data 4 on the process memory 941*m* (step S1221), erases the file of the unnecessary data 2 on the NAS 980 (step S1222), and releases the region of the data 2 on the process memory 941*m* (S1223).

After receiving the data information of the data 3 transmitted from the server 931 in step S1209, further receiving the data information of the data 4 transmitted from the server 941 in step S1220, and then securing the storage region of the data 3 on the own process memory 932*m* (step S1224), the server 932 reads the data 3 from the NA 980 (step S1225). Further, the server 932 secures the storage region of the data 4 on the process memory 932*m* (step S1226), reads the data 4 from the NAS 980 (step S1227), and stores the data 4 to the storage region.

The server 932 processes the data 3 and data 4 to generate the data 5 (step S1228), secures the storage region of the data 5 on the own process memory 932*m* (step S1229), and in a state where the data 5 is being stored in that region temporarily (step S1230), outputs the data 5 to the NAS 980 (step S1231).

The server 932 checks the output result when outputting the data 5 to the NAS 980. After checking the output result, the server 932 transmits the data information of the data 5 to the server 931 (step S1232), and releases the region of the data 5 on the process memory 932*m* (step S1233). Subsequently, the server 932 erases the file of the unnecessary data 3 on the NAS 980 (step S1234), and further releases the region of the data 3 on the process memory 932m (S1235). Further, the server 932 erases the file of the unnecessary data 4 on the NAS 980 (step S1236), and releases the region of the data 4 on the process memory 932m (S1237).

As literatures of the related techniques, there are following Patent Documents. Japanese Unexamined Patent Publication 2006-259981 (Patent Document 1) discloses a parallel batch processing system which executes processing at a high speed through executing data distribution processing and application processing in parallel, in particular a technique which reads in advance the input data of a next transaction during data processing other than an access to a disk device. Japanese Unexamined Patent Publication Hei 06-348740 (Patent Document 2) discloses a collective processing system which speeds up the execution through executing transaction processing by distributing it to a plurality of execution devices.

Japanese Patent No. 4104281 (Patent Document 3) discloses an online transaction system which lightens the load on the system by employing a structure which duplicates the disk, stops duplication processing and updates the other when a read access is being executed, and restarts the duplication processing at a point where the read access is ended.

With the multistage online transaction system 901 having the structure which inputs and outputs the data of transactions target, NAS becomes a large factor for the bottleneck of the transaction performance. The processing waiting action generated in NAS can be the bottleneck for the processing in the entire system.

In practice, an extremely greater number of servers execute the transactions for a greater number of pieces of data asynchronously than the operation shown as an example described in FIG. 8-FIG. 10. Thus, a great number of file accesses are made to the NAS. Load on the NAS generated by the transactions by a single server causes to other servers to wait for the processing, which results in delaying the transactions of the entire system. That is, the existence of the NAS can be the bottleneck.

In order to overcome such bottleneck, there may be considered to disperse the load by using a plurality of disk devices for the NAS. However, a great number of resources are required for that, so that the device may become of high price.

To replace the NAS not with the disk device but with on-memory type database is difficult in terms of the characteristics of the processing executed on the online transaction system, since the NAS also functions for guaranteeing the data as described above. Further, the number of data that can be handled with the on-memory type database depends on the capacity of the memory, so that it is difficult to secure the capacity as that of the disk device. Even if it is replaced with a hybrid-type database, all the records within a table are to be updated when updating data due to the characteristic of intermediate data. Thus, for guaranteeing the permanence of the data, it is necessary to save a large amount of logs that are equal to or more than the amount of files of the conventional case. Therefore, it is not practical.

Further, while the technique of Patent Document 1 improves throughput by saving the file input time through reading input data in advance, it does not lighten the load itself on the disk device. While the technique of Patent Document 2 executes transaction processing by distributing it to a plurality of execution devices, it does not decrease accesses to the disk device. While the technique of Patent Document 3 performs duplication processing of the disk device, it does not decrease the access itself to the disk device, either. That is, none of Patent Documents 1-3 described above lightens the load on the disk device (NAS).

An exemplary object of the present invention is to provide a multistage online transaction system, a server, a multistage online transaction processing method, and a program which can improve the processing speed by overcoming the bottleneck in the processing while keeping the reliability through decreasing accesses to NAS (shared storage).

SUMMARY OF THE INVENTION

In order to achieve the foregoing exemplary object, the multistage online transaction system according to an exemplary aspect of the invention is a system in which a plurality of nodes including a plurality of servers for processing input data are connected mutually with at least one NAS (shared storage) shared among the plurality of nodes via a network, wherein at least one of the nodes includes a shared memory from/to which each of the servers belonging to a same node can read and write data, and each of at least two of the servers belonging to the node having the shared memory includes: a node judging device which judges whether or not output destination of output data acquired by processing the input data is a server belonging to the same node as that of the server itself; a data storage memory acquiring device which secures a storage region of the output data on the shared memory when the output destination is the server belonging to the same node; and a data processor which processes the input data and stores the output data to the storage region.

In order to achieve the foregoing exemplary object, the server according to another exemplary aspect of the invention is a server connected mutually with at least one NAS (shared storage) which is shared among a plurality of nodes via a network. The server includes: a data processor which is capable of generating output data by processing input data and outputting the output data to a shared memory from/to which each of computers belonging to a same node read and write data; a node judging device which judges whether or not output destination of the output data acquired by processing the input data is a server belonging to the same node as that of the server itself; and a data storage memory acquiring device which secures a storage region of the output data on the shared memory when the output destination is the server belonging to the same node, wherein the data processor processes the input data and stores the output data to the storage region.

In order to achieve the foregoing exemplary object, the transaction data processing method according to still another exemplary aspect of the invention is a method for outputting output data by processing input data with a multistage online transaction system in which a plurality of nodes including a plurality of servers and a shared memory from/to which each of the servers can read and write data are mutually connected with at least one NAS (shared storage) shared among the plurality of nodes via a network. The method includes: generating the output data by processing the input data by using a data processor; judging whether or not output destination of the output data is a server belonging to the same node by using a node judging device; securing a storage region of the output data on the shared memory by using a data storage memory acquiring device, when the output destination is the server belonging to the same node; and storing the output data to the storage region by using the data processor.

In order to achieve the foregoing exemplary object, the transaction processing program according to still another exemplary aspect of the invention is a program used in a multistage online transaction system in which a plurality of nodes including a plurality of servers and a shared memory from/to which each of the servers can read and write data are mutually connected with at least one NAS (shared storage) shared among the plurality of nodes via a network. The program causes a computer provided to each of the nodes to execute: a function of generating the output data by processing the input data; a function of judging whether or not output destination of the output data is a server belonging to the same node; a function of securing a storage region of the output data on the shared memory, when the output destination is the server belonging to the same node; and storing the output data to the storage region.

BRIEF DESCRIPTION OF THE DRAWINGS

FIGS. 4A and 4B show flowcharts of operations of the main elements among the server process shown in FIG. 3, in which FIG. 4A shows the operation of a data storage memory acquiring device and FIG. 4B shows the operation of a data output device;

FIGS. 5C and 5D show flowcharts following those of FIGS. 4A and 4B, in which FIG. 5C shows the operation of a file commit device and FIG. 5D shows the operation of a data storage memory referring device;

FIG. 6E shows a flowchart following those of FIGS. 4A and 4B and FIGS. 5C and 5D, which illustrates the operation of a data erasing device;

DETAILED DESCRIPTION OF THE EXEMPLARY EMBODIMENTS

Figure 1:
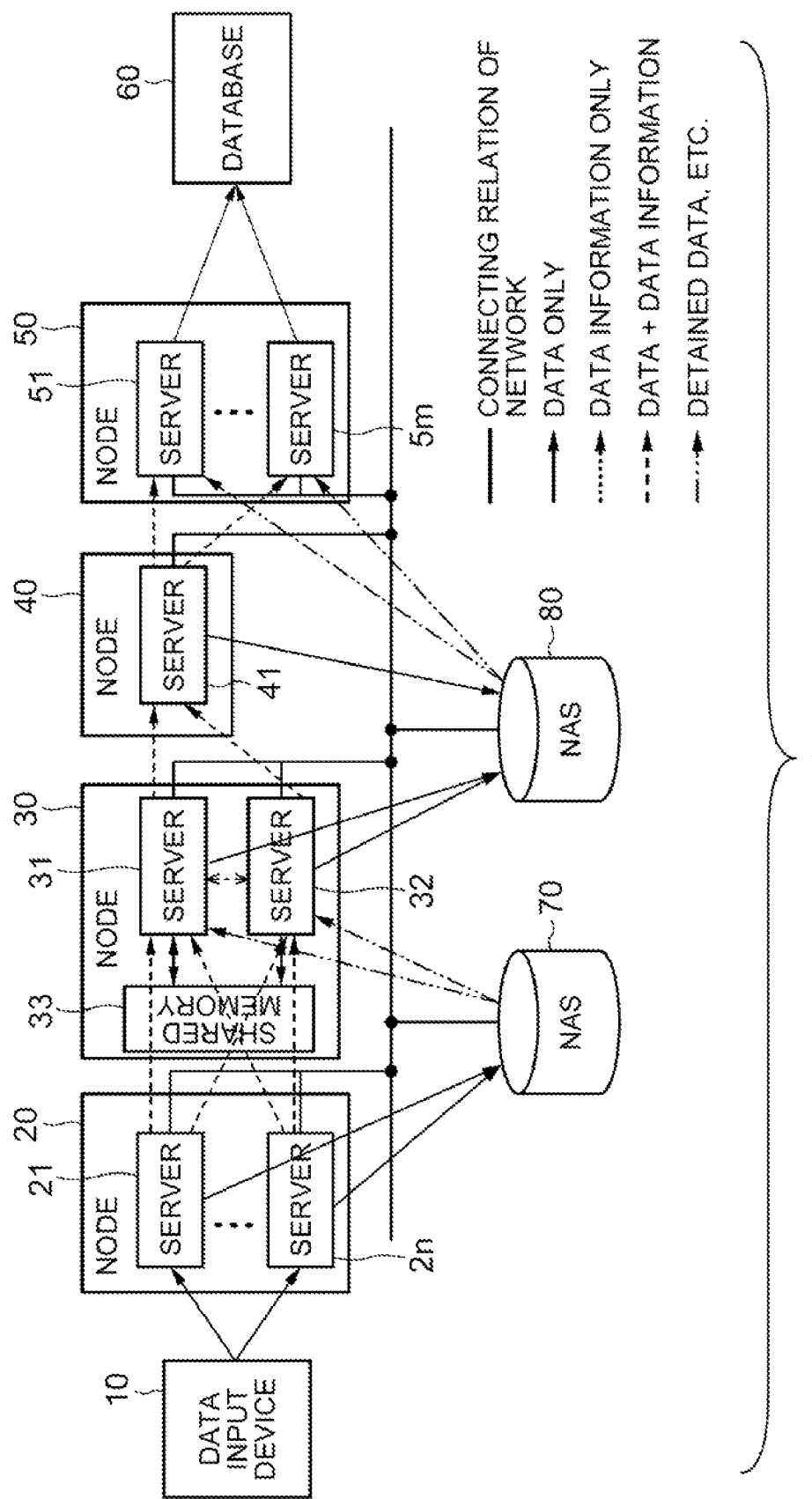
FIG. 1 is an explanatory diagram showing an example of the structure of a multistage online transaction system according to an exemplary embodiment of the present invention.

Hereinafter, the structure of a first exemplary embodiment of the present invention will be described by referring to the accompanying drawings of FIG. 1-FIG. 3.

First, the basic contents of the exemplary embodiment will be described, and more specific contents will be described thereafter.

A multistage online transaction system 1 according to the exemplary embodiment is a system in which a plurality of nodes 20-50 including a plurality of servers for processing input data and at least one NAS (shared storages) 70, 80 which are shared among the plurality of nodes are connected mutually via a network.

At least one of the nodes includes a shared memory 33 from/to which each of servers 31, 32 belonging to the same node can read and write data. Further, each of at least two servers 31, 32 belonging to the node having the shared memory includes: a node judging device 151 which judges whether or not the output destination of output data that is obtained by processing the input data is the server which belongs to the same node as that of the server itself; a data storage memory acquiring device 155 which secures a storage region of the output data on the shared memory if the output destination is the server belonging to the same node; and a data processor 161 which processes the input data and stores the output data to the storage region.

Each of the servers 31 and 32 includes a data storage memory referring device 154. The data storage memory referring device 154 selects the reference target of the data from a process memory 105 and a shared memory 106 and acquires a region based on the result of judgment made by the node judging device 151. Therefore, the data storage memory referring device 154 selects the shared memory 106 when the output destination of the processed data is the server belonging to the same node, and selects the process memory when it is not the server belonging to the same mode.

Further, each of the servers 31 and 32 includes a process memory 111 from/to which data cannot be read and written by other servers, and a data transmitting device 152 which transmits data to other servers. Further, each of the servers 31 and 32 includes a data output device 156 which outputs the output data to the process memory 111 when the output destination is not the server belonging to the same node and, in parallel to this, executes a file access device 164 to output the output data to the NAS 80.

Further, each of the servers 31 and 32 includes a file commit device 157 which transmits data information to the output-destination server after waiting for the file access device 164 to complete the output of the file to the NAS 80. Furthermore, each of the servers 31 and 32 includes a data erasing device 158 which issues an erasing request of the input data to the NAS 80 and, in parallel to this, releases the storage region of the shared memory 33 or the process memory 111 where the input data is stored.

Note here that the data storage memory acquiring device 155 includes a function of securing the storage region in the process memory 111, when the storage region of the output data cannot be secured on the shared memory 33.

Through having the above-described structure, accesses to the NAS can be decreased effectively.

This will be described in more details hereinafter.

FIG. 1 is an explanatory diagram showing an example of the structure of a multistage online transaction system 1 according to an exemplary embodiment of the present invention. The multistage online transaction system 1 is formed by mutually connecting a plurality of nodes sharing the NAS (Network Attached Storage) via a network.

Here, a case of a very simple system structure is shown as a way of example. The data inputted from a data input device 10 is processed by going through a plurality of nodes 20, 30, 40, 50, and is inputted to a database 60 at last. Further, the node 20 and the node 30 use the NAS 70 for sharing the data, and the node 30, the node 40, and the node 50 use the NAS 80 for sharing the data. The connecting relation regarding the nodes and the NAS is the same as the relation shown in the section of "Description of the Related Art".

Each of the nodes is configured with at least one server. In the case shown in FIG. 1, the node 20 is configured with n-pieces of servers 21-2n (n is a natural number), and the node 50 is configured with m-pieces of servers 51-5m (m is a natural number, m=n or m≠n). In the meantime, the node 30 is configured with two servers 31 and 32, while the node 40 is configured with a single server 41.

The node 30 is provided with a shared memory 33 which is shared by the servers 31 and 32, and to/from which the data can be referred, read, and written from the servers 31, 32. A memory to/from which the data can be referred, read, and written only from each server is called a process memory. The server 31 includes a process memory 31m, the server 32 includes a process memory 32m, and the server 41 includes a process memory 41m.

The servers 31 and 32 belonging to the same node 30 normally exchange the data via the shared memory 33 without the NAS 80, and output a file in which the data is loaded to the NAS 80. This makes it possible to decrease the number of data accesses made to the NAS 80. When there is detention of data occurred due to dysfunctions and the like of the shared memory 33, the servers 31 and 32 belonging to the same mode can read the file stored in the NAS 80 and guarantee the intermediate data of the transaction processing.

In FIG. 1, solid zigzag lines show the connecting relation of the network, solid arrows show the flows of data, dotted-line arrows show the flows of the data information, dashed lines show the flows of information that is a combination of the data and the data information, and alternate long and short dash lines show the flow of data when there is occurrence of data detention and the like. In practice, the data and the data information are all exchanged via the network. All the arrows are illustrated to distinguish the flows of the data and the flows of the data information as a concept.

Figure 2:
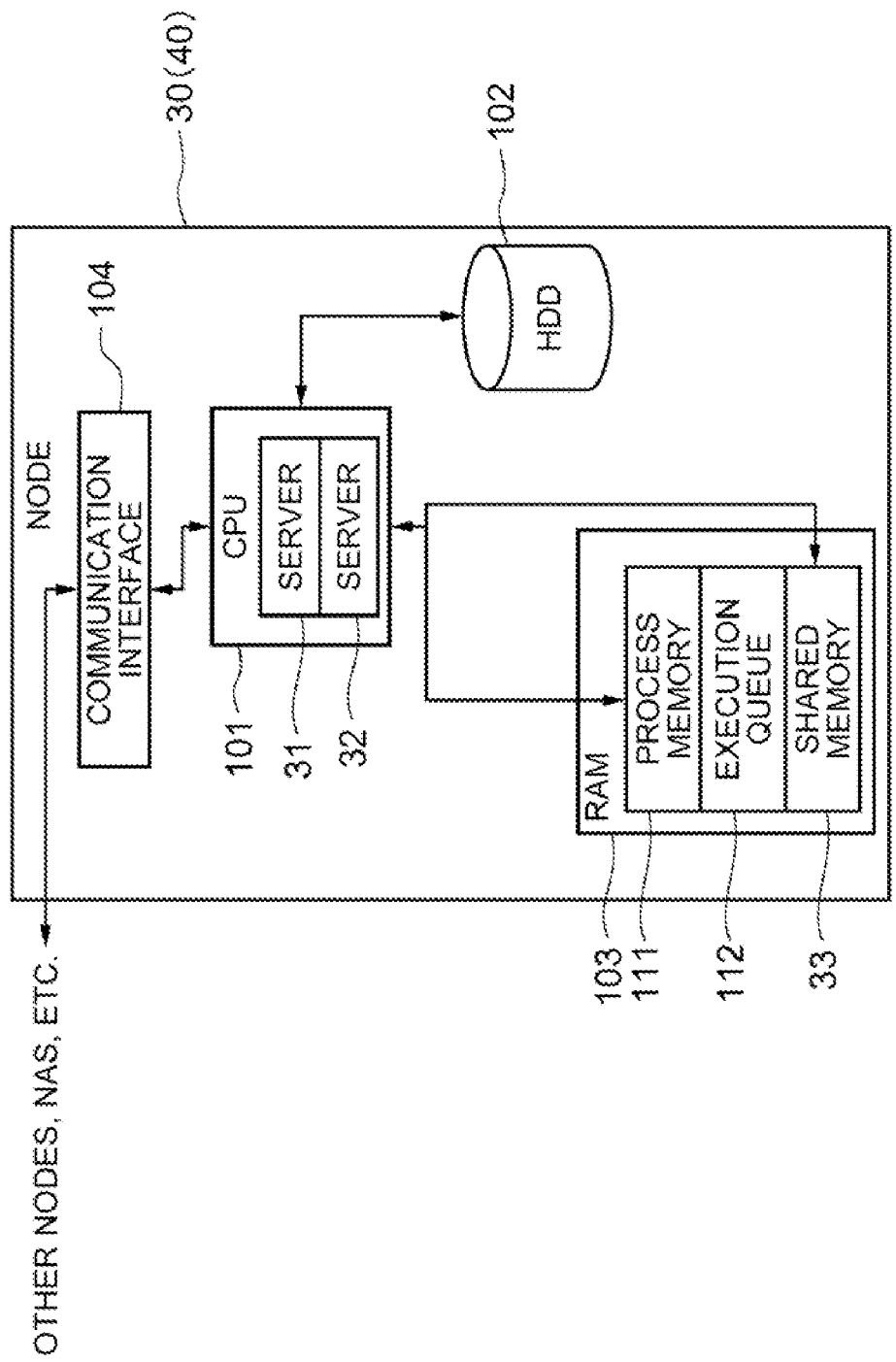
FIG. 2 is an explanatory diagram showing the internal structure of a server shown in FIG. 1.

FIG. 2 is an explanatory diagram showing the internal structure of the node 30 shown in FIG. 1. The node 30 is a typical computer device which includes: a CPU 101 which is the main body that executes computer programs; an HDD 102 in which the computer programs executed by the CPU 101 are stored; a RAM 103 in which the program and the data read from the HDD 102 by the CPU 101 is temporarily stored; and a communication interface 104 which performs communications with other nodes and NAS via a telecommunications line.

The CPU 101 executes each of the different computer programs so that the servers 31 and 32 which execute the individual processing are operated on software. A region as the process memory 111 and a region as the shared memory 33 shared by each server are secured on the RAM 103. The shared memory 33 is used in common by the servers 31 and 32 as a buffer 106 for inputting/outputting data and outputting files. The process memory 111 is used by each server as a buffer 105 for inputting/outputting files. Further, a part of the RAM is used as an execution queue 112 which manages data for managing the output of processed data when outputting the processed data to the NAS 980 in a "first in, first out" manner.

In the case of FIG. 1, the node 40 is formed with a single server 41, and it is different from the servers 31, 32 of the node 30 in respect that the shared memory is not provided thereto.

Figure 3:
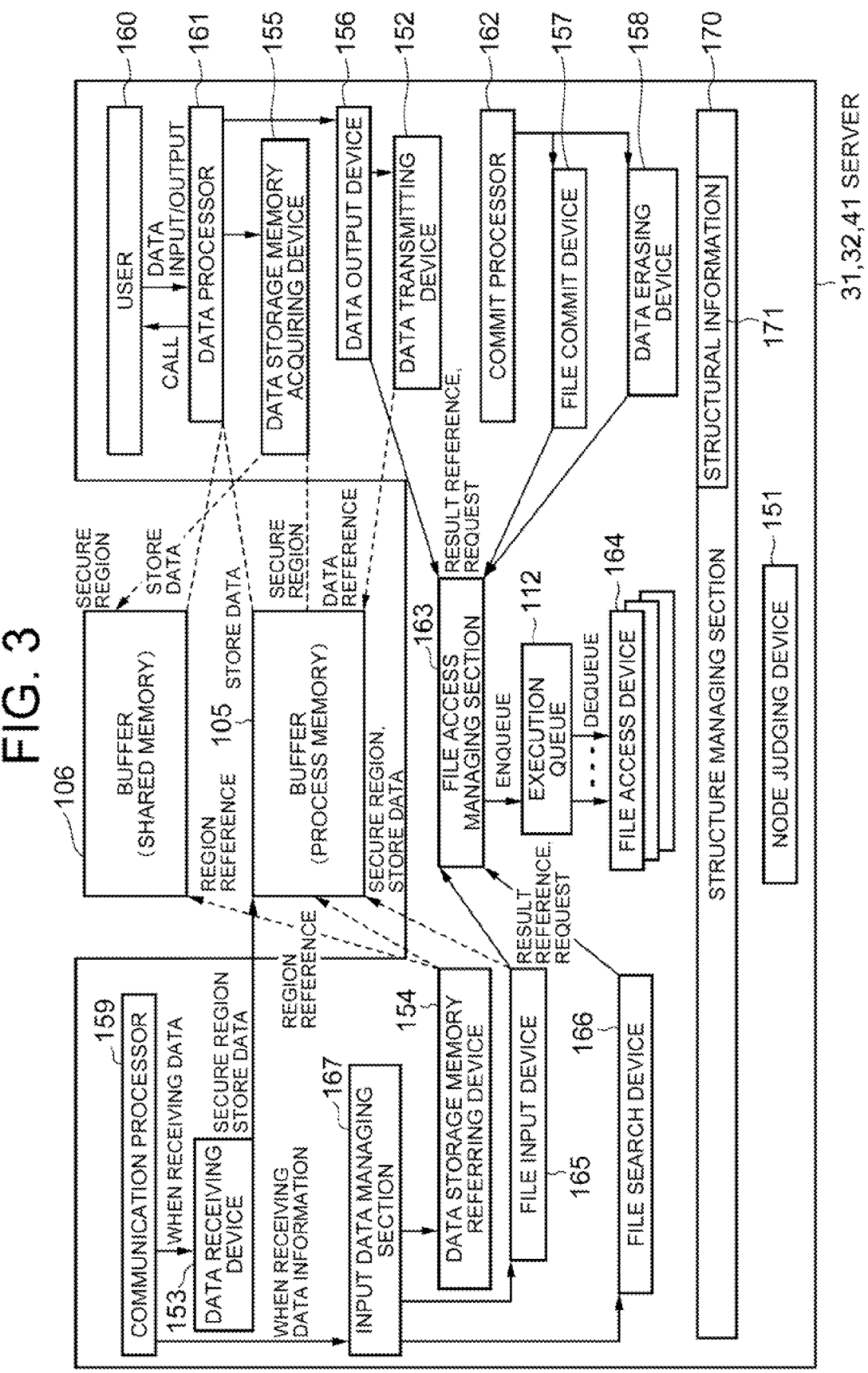
FIG. 3 is an explanatory diagram showing the structure of each server process executed by a CPU shown in FIG. 2.

FIG. 3 is an explanatory diagram showing the structure of the servers 31 and 32 shown in FIG. 2. As shown in FIG. 3, each of the servers 31 and 32 includes a node judging device 151, a data transmitting device 152, a data receiving device 153, a data storage memory referring device 154, a data storage memory acquiring device 155, a data output device 156, a file commit device 157, a data erasing device 158, a communication processor 159, a user application 160, a data processor 161, a commit processor 162, a file access managing section 163, a file access device 164, a file input device 165, a file search device 166, an input data managing device 167, and a structure managing section 170.

The node judging device 151, the data transmitting device 152, the data receiving device 153, the data storage memory referring device 154, the data storage memory acquiring device 155, the data output device 156, the file commit device 157, the data erasing device 158, the communication processor 159, the user application 160, the data processor 161, the commit processor 162, the file access managing section 163, the file access device 164, the file input device 165, the file search device 166, the input data managing device 167, and the structure managing section 170 are built on software when the CPU 11 executes the computer programs. These computer programs are recorded on recording media and handled as subjects of commercial transactions.

Figure 4A:
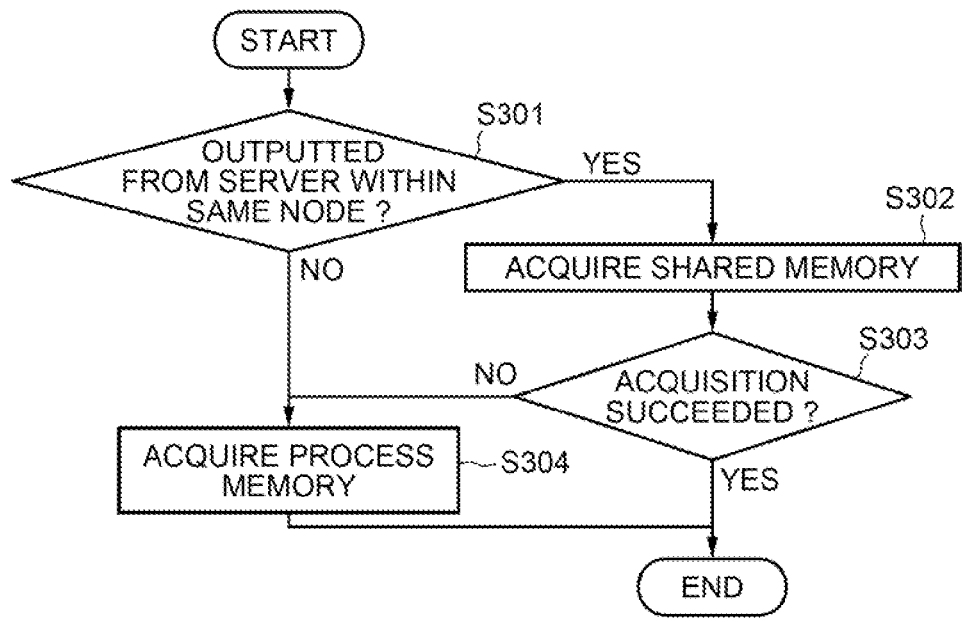
Figure 4B:
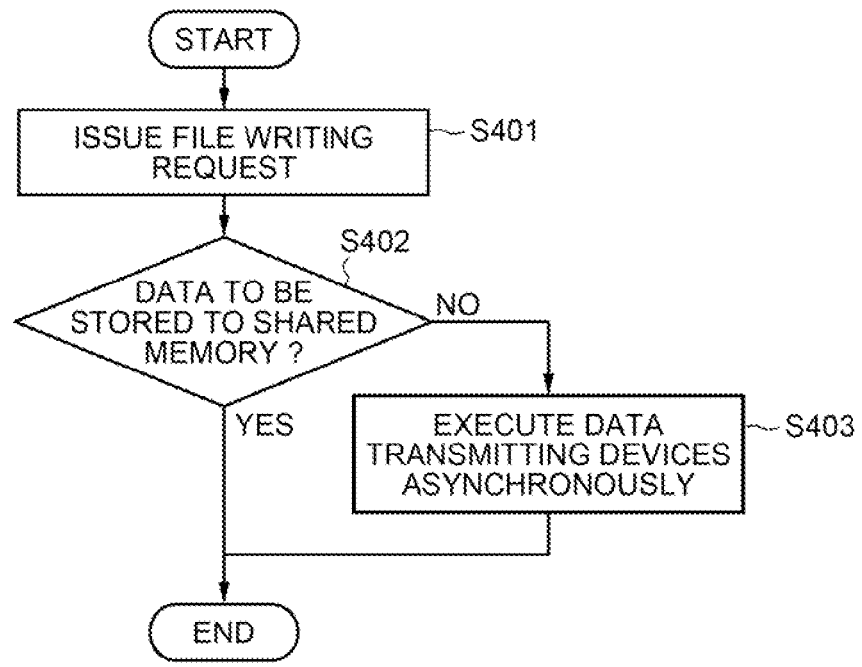
Figure 5C:
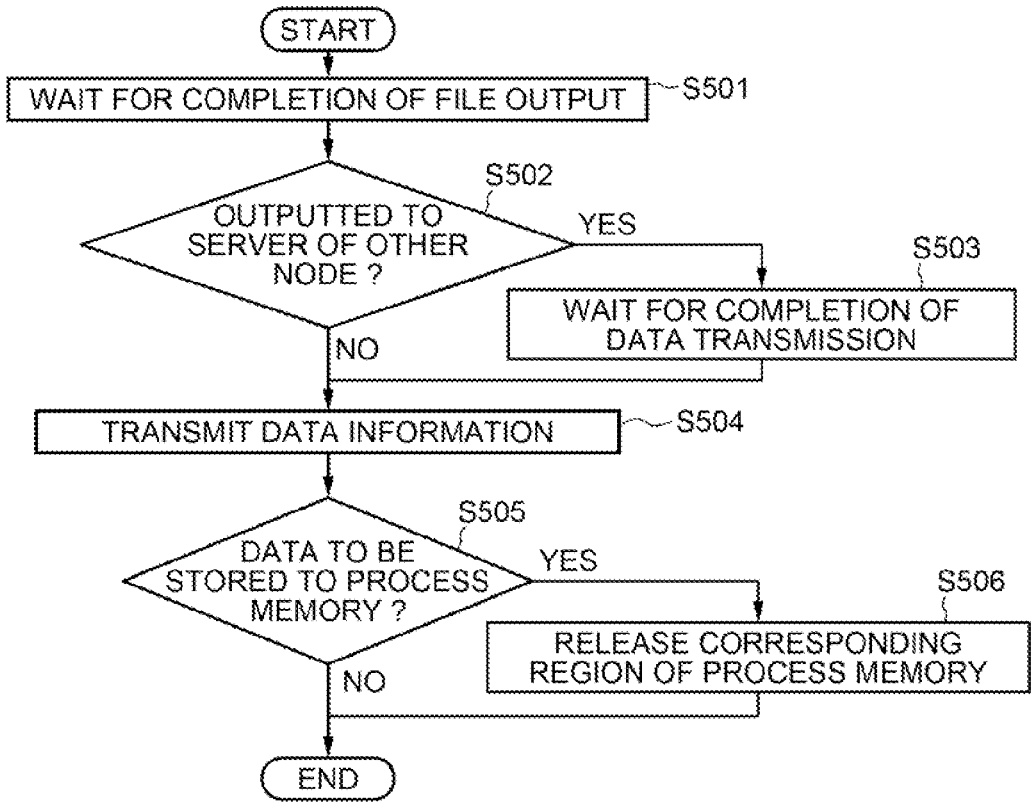
Figure 5D:
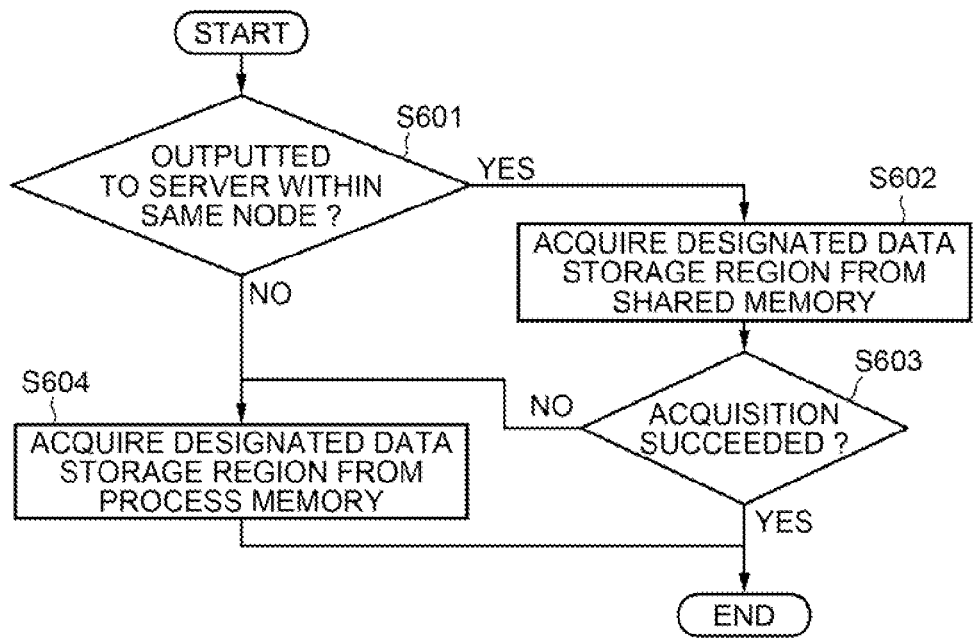

FIG. 4-FIG. 6 are flowcharts for describing the operations of the structural elements provided to the servers shown in FIG. 3. FIG. 4A and FIG. 4B respectively show the operations of the data storage memory acquiring device 155 and the data output device 156 provided to each of the servers 31 and 32. FIG. 5C and FIG. 5D respectively show the operations of the file commit device 157 and the data storage memory referring device 157 provided to each of the servers 31 and 32. FIG. 6E shows the operation of the data erasing device 158 provided to each of the servers 31 and 32.

The node judging device 151 judges whether the output-destination server that is the destination of the data processed by the server or the data-outputting server that is the server which has processed the data exists within the own node based on structure information 171 managed by the structure managing section 170. The data transmitting device 152 outputs the data to the output-destination server. The data receiving device 153 receives data from other servers and stores the received data to the own process memory.

As shown in FIG. 5D, the data storage memory referring device 154 determines the reference target of the data based on the judgment result regarding the data-outputting server obtained by the node judging device 151 (step S601). When the data-outputting server is on the same node as that of the own server, the data storage memory referring device 154 selects the shared memory 106 and acquires a region as the data stored region (step S602). When it is on another node, the data storage memory referring device 154 selects the process memory 105 and acquires a storage region (step S604). Further, when the data-outputting server is on the same node as that of the own server but acquisition of the storage region from the shared memory 106 is failed, the data storage memory referring device 154 acquires the region from the process memory 105 (steps S603 and S604).

As shown in FIG. 4A, the data storage memory acquiring device 155 determines the memory for storing the output data based on the judgment result regarding the data-outputting server obtained by the node judging device 151 (step S301). When the data-outputting server is on the same node as that of the own server, the data storage memory acquiring device 155 selects the shared memory 106 and acquires a region for storing the output data in the shared memory 106 (step S302). When it is on another node, the data storage memory acquiring device 155 selects the process memory 105 and acquires a region for storing the output data on the process memory 105 (step S304). Further, when the data-outputting server is on the same node as that of the own server but acquisition of the storage region from the shared memory 106 is failed, the data storage memory acquiring device 155 acquires the region from the process memory 105 (steps S303 and S304).

As shown in FIG. 4B, the data output device 156 issues a file writing request of the data for the file access managing section 163 to have it output the file (step S401) and, in parallel to this, executes the data transmitting device 152 to directly transmit the data to the output-destination server (steps S402 and S403) when the data is stored in the process memory 105.

As shown in FIG. 5C, the file commit device 157 outputs the file by the data output device 156, and then waits for completion of the file output (step S501). Further, when the output destination is the server on other nodes, the file commit device 157 waits for completion of the data transmission (steps S502 and S503), and then transfers the data information (step S504). Further, the file commit device 157 releases the storage region on the process memory only when the data storing destination is the process memory (steps S506 and S506). This means that the storage region releasing processing is not executed when the data storing destination is the shared memory.

As shown in FIG. 6E, the data erasing device 158 first issues an erasing request of the file corresponding to the input data (step S701) and, in parallel to the erasure of the file, judges whether the storing destination of the corresponding input data is the shared memory or the process memory (step S702). Then, the data erasing device 158 releases the storage region of the corresponding shared memory or process memory (step S703 or S704), and waits for completion of the file erasure (step S705).

The communication processor 159 operates the data receiving device 153 when receiving the data. Upon receiving the data information regarding the data that is processed by the server, the communication processor 159 gives the information data to the input data managing section 167. The user application 160 executes actual data processing for the inputted data. The data processor 161 executes input/output of data to/from the user application.

The commit processor 162 performs an operation for committing the data to be described later by executing the file commit device 157. The file access managing section 163 issues a request for outputting the file of the data outputted by the data processor 161 to the NAS, and outputs the request to the execution queue 112. The two or more file access devices 164 monitor the request to the execution queue 112, takes out the file output request stored therein, and outputs the data file to the NAS asynchronously. The file input device 165 reads the data from the file in the NAS. The file search device 166 searches the file outputted to the NAS. The input data managing section 167 performs the operation related to reception of data to be described later.

The structure managing section 170 manages the structure information 171 of the entire multistage online transaction system 1, specifically latest information regarding the positional information including the machine names of the nodes, network addresses, the positional information of the servers, etc., and provides the information for the information request from other processors. The node judging device 151 judges whether or not the data-outputting server or the output destination is on the same mode as that of the own node according to the structure information 171 provided from the structure managing section 170.

At a stage of performing data processing, first, the data processor 161 calls the user application 160. The user application 160 receives the input data from the data processor 161, performs inherent data processing on that application, and gives the output data along with the output destination to the data processor 161.

The data processor 161 executes the data storage memory acquiring device 155 for the output-destination server to perform the operation shown in FIG. 4A, acquires the storage region for storing the data from the shared memory or the process memory according to the result thereof, and copies the data. When the storage region cannot be acquired due to shortage of the region in the shared memory, the storage region is acquired from the process memory. Then, file output of the data is started by the data output device 156. Further, when the data storing destination is the process memory, data transmission to the output-destination server is started by the data transmitting device 152. The data output device 156 does not wait for completion of file output and data transmission, and receives output of other data.

At a stage of committing the outputted data, the commit processor 162 starts the file commit device 157 when the user application 160 completes the processing for all the data. As shown in FIG. 5C, the file commit device 157 waits for the file output done by the data output device 156 and commits the file. Further, when data transmission is conducted, the file commit device 157 waits for completion of the data transmission, and transmits the data information to the output-destination server. Furthermore, when the data storing destination is the process memory, the storage region is released.

When the operation of the file commit device 157 is completed for all the output data, the commit processor 162 starts the data erasing device 158 for all the input data to which the processing has been done to perform the operation shown in FIG. 6E to erase the file in which the input data is stored while releasing the storage region of the shared memory or the process memory in accordance with the data storing destination, and waits for completion of erasing the file.

Upon receiving the output data transmitted from another server, the communication processor 159 calls the data receiving device 153. The data receiving device 153 secures the region for storing the data from the process memory, and stores the received data. When it fails to secure the region due to shortage of the memory or the like, the received data is discarded.

Further, upon receiving the data information, the communication processor 159 gives the data information to the input data managing section 167. The input data managing section 167 schedules the data with which a next transaction is to be done based on the received data information, and executes the data storage memory referring device 154 for the target data.

The data storage memory referring device 154 performs the operation shown in FIG. 5D, and starts the node judging device 151 for the data-outputting server. When it is judged by the node judging device 151 that the data-outputting server is operated on a different node, the data storage memory referring device 154 searches the process memory and acquires the data stored region. When it is judged that the data-outputting serve operates on the same node, the data storage memory referring device 154 searches the shared memory, and acquires the data stored region.

In that case, if the data does not exist in the shared memory, the process memory is searched in the same manner. If the data does not exist in the process memory, either, the file input device 165 is executed to read the data from the file indicated in the data information, and stores it to the storage region of the process memory as in the case shown in FIG. 8-FIG. 10.

When all the input data processed by one-time transaction are stored in the process memory, the input data managing section 167 gives the storage regions of all the input data to the data processor 161, and the data processor 161 starts the transaction.

Through employing the structures described above, the multistage online transaction system 1 can decrease the number of times of writing/reading of the files to the NAS to lighten the bottleneck generated thereby.

Figure 8:
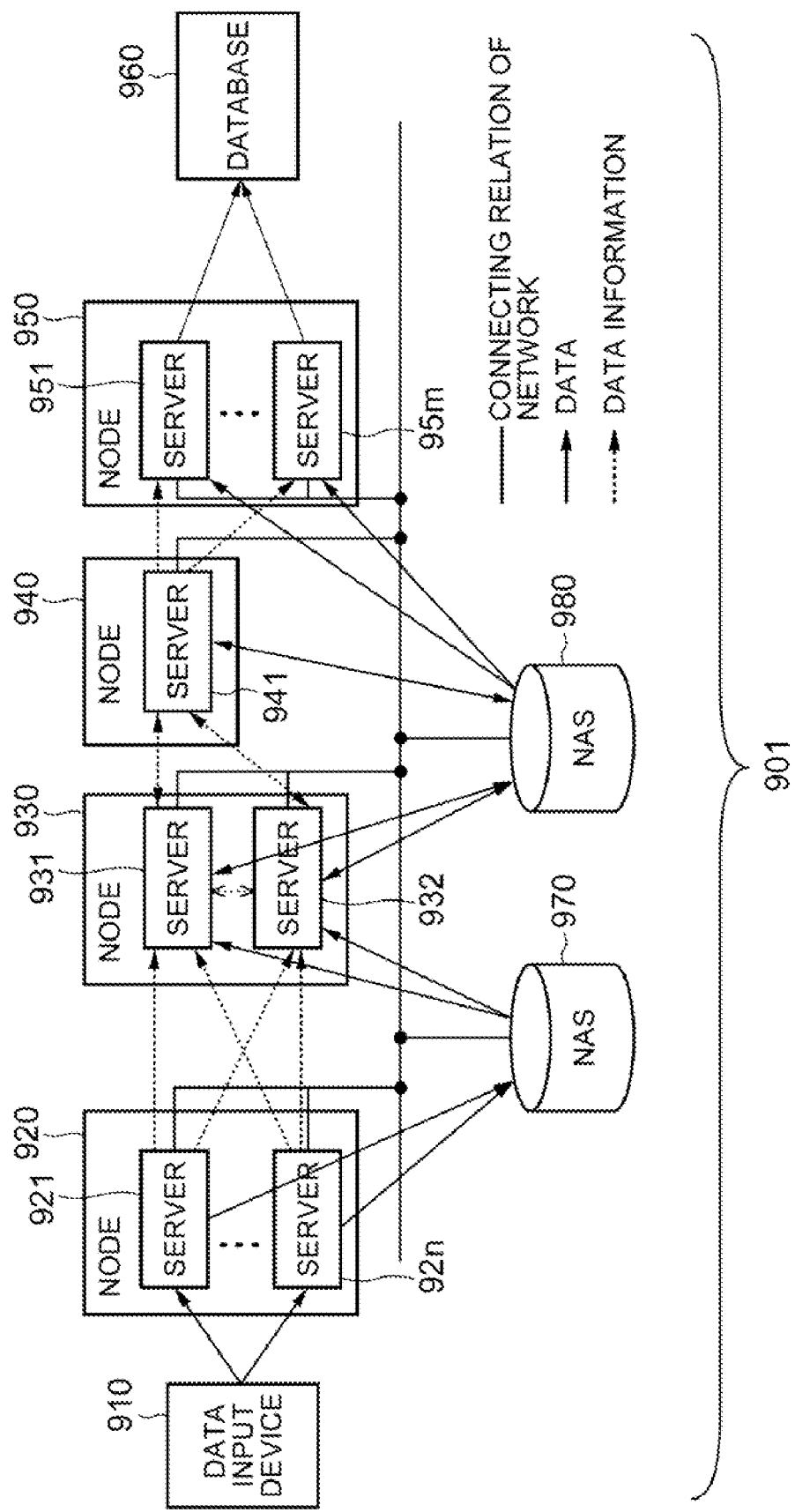
FIG. 8 is an explanatory diagram showing an example of the structure of a typical multistage online transaction system which inputs and outputs data in a form of file.
Figure 9:
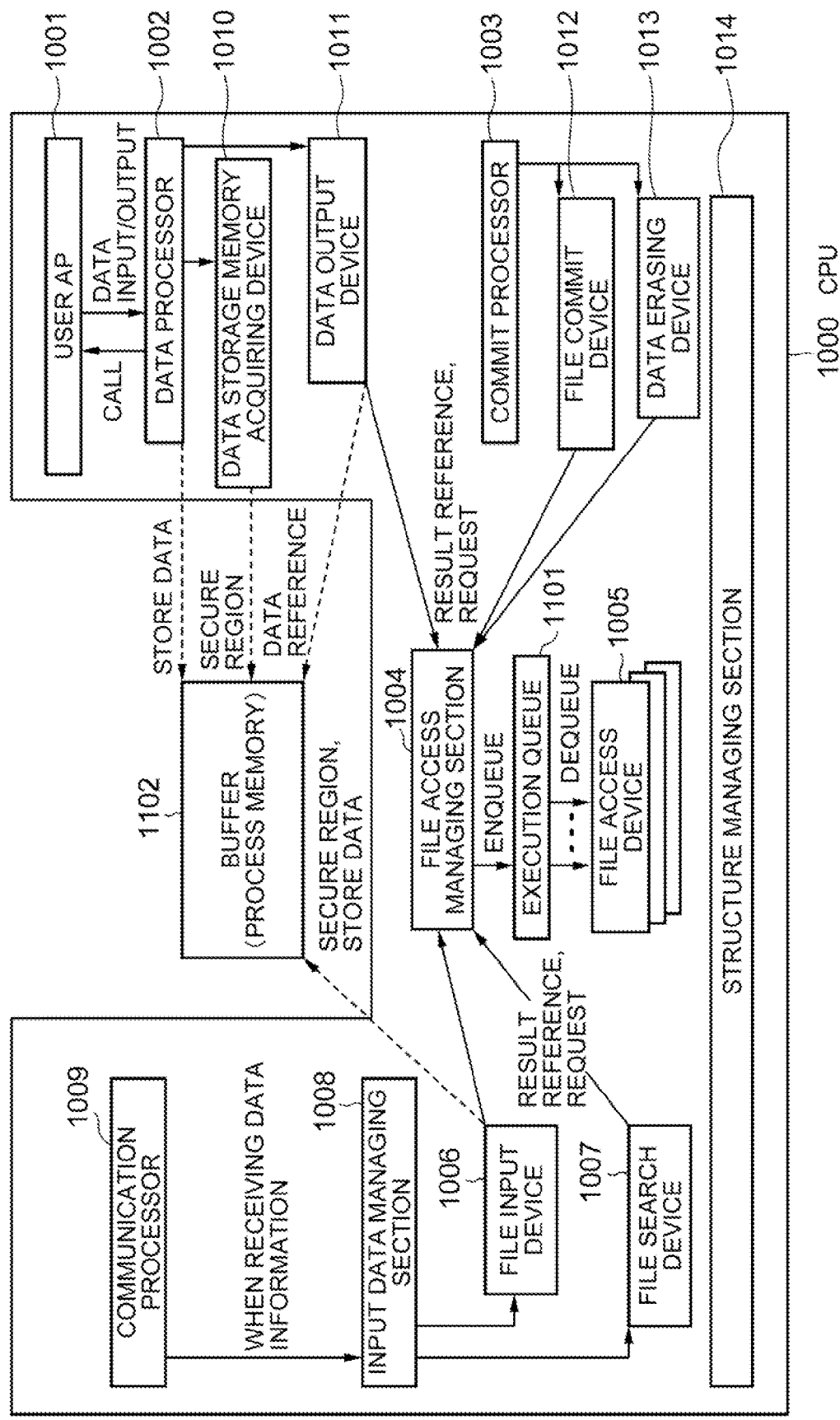
FIG. 9 is an explanatory diagram showing the internal structure of a server shown in FIG. 8.
Figure 10:
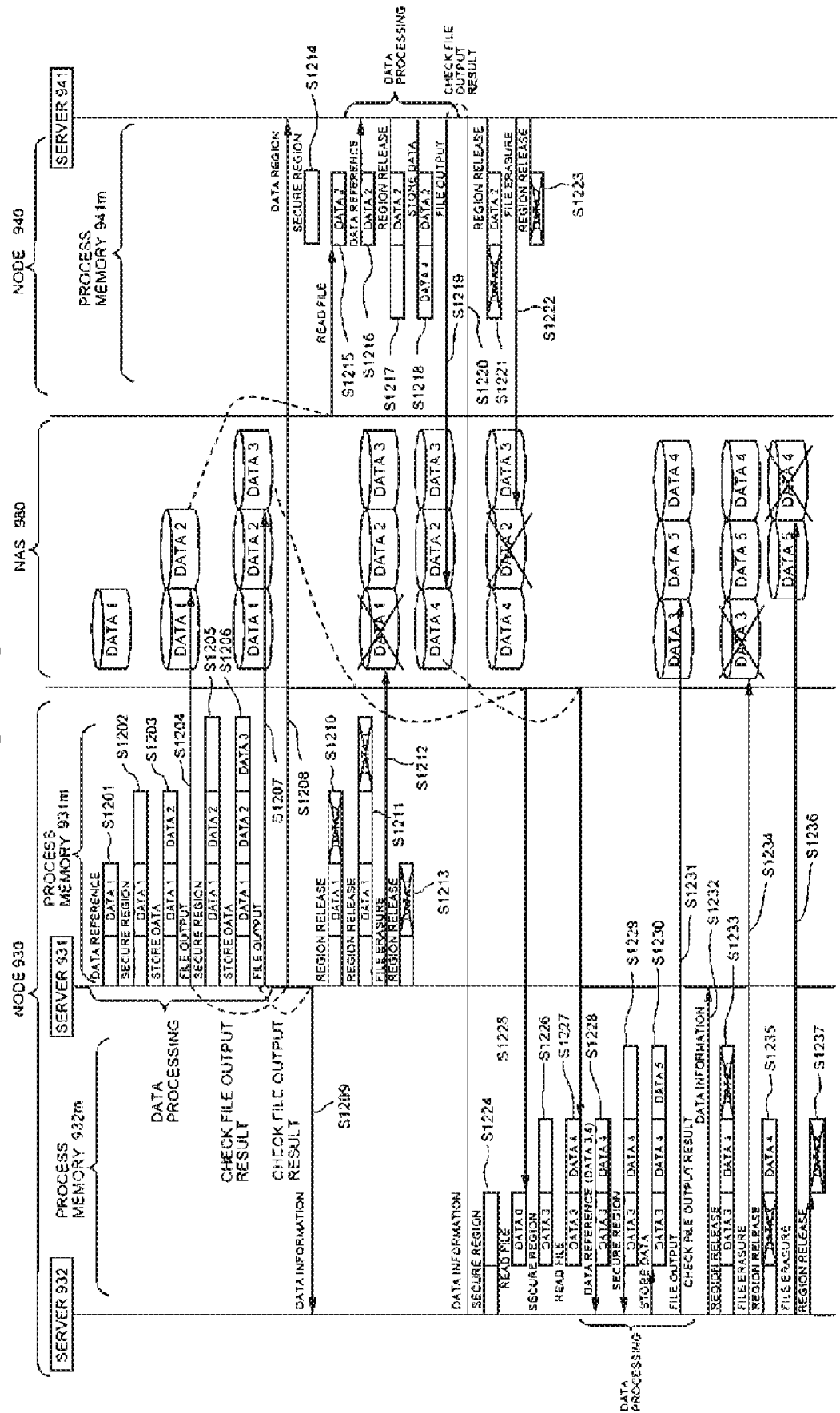
FIG. 10 is an explanatory diagram showing an example of the operation of the multistage transaction system shown in FIG. 8 and FIG. 9.

More specifically, with the typical multistage online transaction system described in FIG. 8-FIG. 10, it is necessary for the data output side to perform data transmission once via the network and file writing once and for the data input side to perform file reading once as well as data reception once via the network and file erasure once. In the meantime, with the system of the exemplary embodiment, the data output side needs to perform data transmission once via the network as well as disk writing once and, when the output destination is the server of another node, to perform in parallel the data transmission once via the network, while the data input side needs to perform only file erasure once. That is, the operation of performing the file reading once can be decreased, and the operation of the data transmission once via the network Can be decreased when the output and input are the servers of the same node.

Next, a method for performing the online transaction processing by using the online transaction system according to the exemplary embodiment will be described.

In the following explanations, the online transaction processing method will be described by separating it into each phase by referring to FIG. 3-FIG. 6.

First, a data processing phase will be described. As shown in FIG. 2, the data processor 161 starts the user application 160. The user application 160 receives input data from the data processor 161, performs processing inherent to the application on the data, and gives output data along with the output destination to the data processor 161.

The data processor 161 outputs the output data to the structure managing section 170. The structure managing section 170 manages the output data by taking it into the structural information 171. The node judging device 151 judges whether the output-destination server of the output data or the data-outputting server that has outputted the data exists within the own node based on the structure information 171 managed by the structure managing section 170.

The data storage memory acquiring device 155 acquires the result judged by the node judging device 151. As shown in FIG. 4A, when it is judged that the output destination of the output data is the server on another node, the data storage memory acquiring device 155 selects the process memory 105 and secures a region for storing the output data on the process memory 105 (steps S301, S304).

When it is judged that the output destination of the output data is the server of the own node, the data storage memory acquiring device 155 selects the shared memory 106 and secures a region for storing the output data in the shared memory 106 (steps S301, S303).

The data processor 161 receives the result from the data storage memory acquiring device 155, and copies the output data to the storage region of the process memory 105 or the shared memory 106 secured by the data storage memory acquiring device 155.

When the region for storing the output data cannot be secured due to shortage of region in the shared memory 106, for example, the data storage memory acquiring device 155 secures the region for storing the output data in the process memory 105. In that case, the data processor 161 writes the output data to the region secured in the process memory 105.

As shown in FIG. 4B, upon receiving the output data from the data processor 161, the data output device 156 issues a file writing request (S401), and requests the file access managing section 163 to output the file in which the output data is loaded to the NAS (S401). The file output request is stored in the execution queue 112. The two or more file access devices 164 monitor the execution queue, take out the stored file output request, and write the file to the NAS asynchronously. The data output device 156 receives output of another output data from the data processor 161 without waiting for completion of the file output, and outputs the output data to the file.

The action of writing the file to the NAS executed when the data output device 156 issues the file writing request is performed for the following output data. That is, the output data is temporarily stored in the process memory when the output destination of the output data is the server of another node, and writing action to the NAS is performed for the output data that is temporarily stored in the process memory. Further, the output data is temporarily stored in the shared memory when the output destination of the output data is the server of the own node, and writing action to the NAS is performed for the output data that is temporarily stored in the shared memory. Furthermore, when the output destination of the output data is the server of the own node but the storage region of the shared memory is insufficient or the like, the output data is temporarily stored in the process memory. In that case, the writing operation to the NAS is performed for the output data stored temporarily in the process memory.

Further, the data output device 156 starts the data communication device 152 when requesting the file output.

When the output destination of the output data is the server of another node, the output data is loaded on the file and temporarily stored in the process memory. Further, when the output destination of the output data is the server of the own node, the output data is temporarily stored in the shared memory. Furthermore, when the output destination of the output data is the server of the own node but the storage region of the shared memory is insufficient or the like, the output data is temporarily stored in the process memory.

As shown in FIG. 4B, the data output device 152 outputs the file stored in the process memory to the data communication device 152 when the output destination of the output data is the server of another node based on the result of judgment made by the node judging device 151, and executes the data communication device 152 asynchronously to transmit the file to the server of another node as the output destination (step S402, step S403).

As shown in FIG. 4B, when the output destination of the output data is the server of the own node based on the result of judgment made by the node judging device 151, the data output device 152 does not output the output data stored in the shared memory (may also be the process memory in some cases) to the data communication device 152 (step S402). In that case, the data communication device 152 does not transmit the data to the server of the own node (step S402).

Next, a commit phase will be described. As shown in FIG. 2, when the user application 160 completes the processing for all the input data, the commit processor 162 starts the file commit device 157.

As shown in FIG. 5C, the file commit device 157 makes inquiry to the file access managing section 163 to check whether or not the output request of the output data file to the file access managing section 162 done by the data output device 156 has been completed, and waits for the completion when it has not been completed (step S501). Further, the file commit device 157 also waits for completion of the output data transmission done by the data communication device 152 (steps S502, S503).

When the output of the data file and the transmission of the output data are completed, the file commit device 157 informs the number of pieces of data, the file size, and the like as the data information to the server of another node that is the output destination (step S504). In that case, the file commit device releases the storage region of the process memory where the data file is stored, since the data file storing destination for the server of another node is the process memory (steps S505, S506).

Then, the file commit device makes inquiry to the file access managing section 163 to check whether or not the output request of the output data to the server of the own node done by the data output device 156 has been completed, and waits for the completion when it has not been completed. When the output of the file is completed, the file commit device informs the number of pieces of data, the file size, and the like as the data information to the server of the own node that is the output destination.

Next, a schedule phase will be described. As shown in FIG. 2, when receiving the output data transmitted from another server, the communication processor 159 starts the data receiving device 153. The data receiving device 153 secures the region for storing the output data from the process memory, and stores the received data to that region. The data receiving device 153 discards the received data when the storage region cannot be secured due to shortage of the storage region in the process memory, for example.

Further, upon receiving the data information, the communication processor 159 gives the data information to the input data managing section 167. The input data managing section 167 schedules the data with which a next transaction is to be done based on the data information, and starts the data storage memory referring device 154 for processing the target data.

The data storage memory referring device 154 starts the node judging device 151 for judging the node of the data-outputting server that has outputted the output data.

As shown in FIG. 5D, when it is judged by the node judging device 151 that the data-outputting server is of a different node, the data storage memory referring device 154 searches the process memory, acquires the data stored region of the data, and stores reference-destination data showing the storing destination of the corresponding data to that region (steps S601, S604).

When it is judged by the node judging device 151 that the data-outputting serve operates on the same node, the data storage memory referring device 154 searches the shared memory, acquires the data stored region of the data, and stores reference-destination data showing the storing destination of the corresponding data to that region (steps S601, S602).

As shown in FIG. 5D, when the necessary storage region does not exist in the shared memory, the data storage memory referring device 154 searches the process memory in the same manner, and performs storing processing of the reference-destination data described above (steps S603, S604).

The corresponding data means the data that is received by the data receiving device 159 and stored in the process memory, which is the data required when the data processor 161 executes the processing.

When the received data received by the data receiving device 159 is not stored in the process memory, the data storage memory referring device 154 starts the file input device 165. The file input device 165 reads the corresponding data from the NAS in the same manner as the operation of the file input device 1006 shown in FIG. 9, and stores the corresponding data to the process memory.

When all the input data processed by one-time transaction are stored in the process memory, the input data managing section 167 transmits the storage regions of all the input data to the data processor 161.

The data processor 161 starts the transaction by reading the corresponding data from the shared memory or the process memory based on the data of the storing destination from the input data managing section 167.

With the system described in FIG. 8, it is necessary for the data output side to perform data transmission once via the network and file writing once and for the data input side to perform file reading once as well as data reception once via the network and file erasure once. In the meantime, with the system of the exemplary embodiment, the data output side needs to perform data transmission once via the network as well as disk writing once and, when the output destination is the server of another node, to perform in parallel the data transmission once via the network, while the data input side needs to perform only file erasure once. That is, the operation of performing the file reading once can be decreased, and the operation of the data transmission once via the network can be decreased when the output and input are the servers of the same node.

Figure 7:
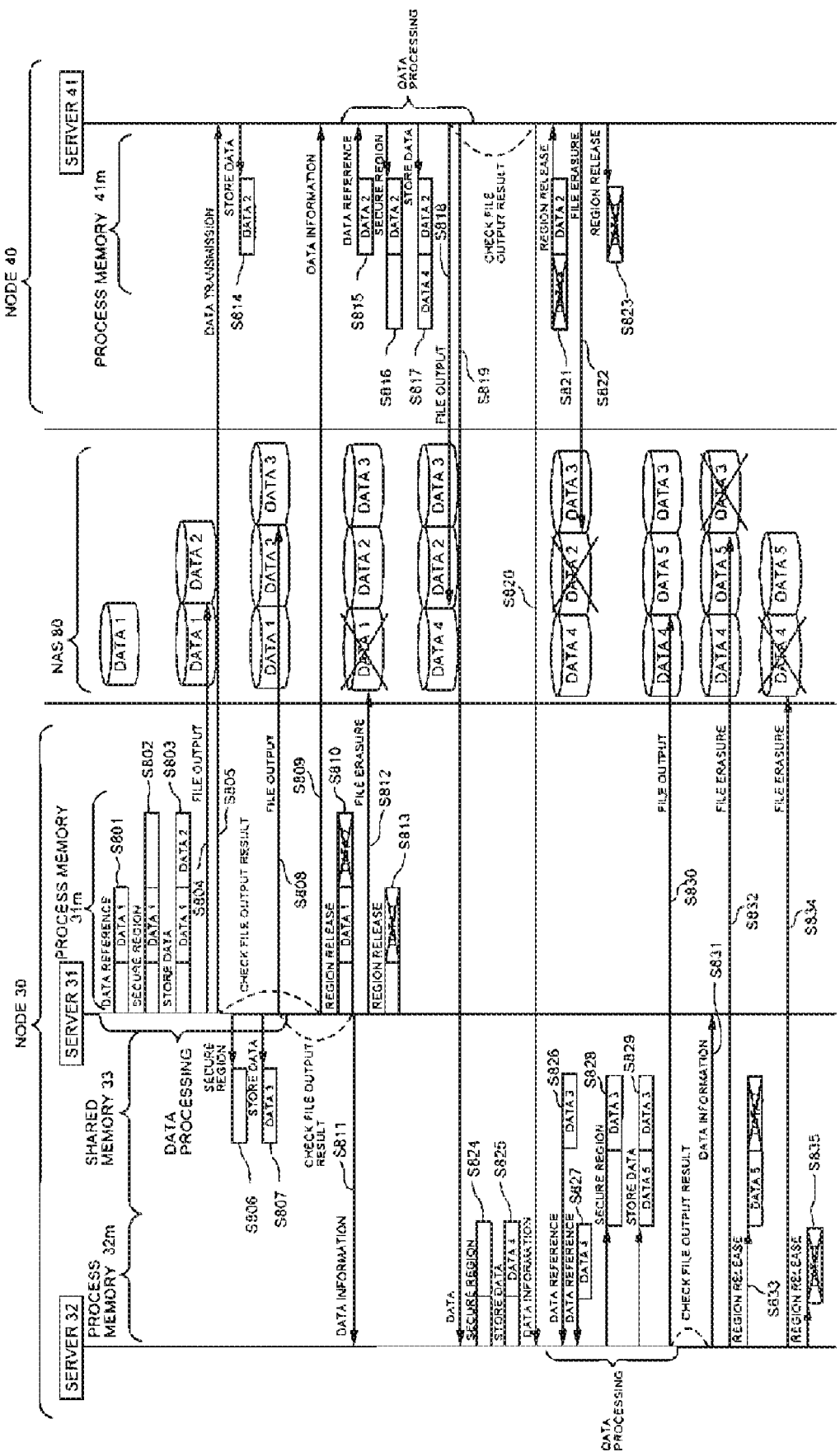
FIG. 7 is an explanatory diagram showing an example of the operation of the multistage online transaction system shown in FIG. 1.

Next, a method for performing the online transaction processing by using the system according to the exemplary embodiment shown in FIG. 1 will be described in a more specific manner by referring to a case shown in FIG. 7.

The input data for the system is inputted by the file input device 165 shown in FIG. 1 or data in some kind of data form is generated by the file input device 165. In FIG. 7, the online transaction processing is started in a state where data 1 is already being stored in a process memory 31m as the input data of the server 31.

In the server 31 of the node 30, the data processor 161 reads the data 1 decompressed on the process memory 31m (step S801), and gives the data 1 to the user application 160. In a process of performing the data processing of the user application 160, the data processor 161 outputs data 2 and data 3.

First, when outputting the data 2, the data storage memory acquiring device 155 acquires the output from the data processor 161, and checks presence of the storage region in the shared memory 106 and the process memory 105. The data storage memory acquiring device 155 starts the node judging device 151, judges that the server 41 as the output destination of the data 2 is on another node 40, and secures a region in a size that is necessary to store the data 2 on the process memory 105 (S802).

The data processor 161 acquires information from the data storage memory acquiring device 155, and stores the data 2 to the secured process memory (S803). Thereafter, the data processor 161 starts the data output device 156.

Upon receiving the data 2 from the data processor 161, the data output device 156 requests the file access managing section 163 to output the file of the data 2. The file output request is stored in the execution queue 112. The file access device 164 monitors the execution queue 112, takes out the stored file request, and performs the execution asynchronously to store the data 2 in a file form to the NAS 80 (S804). In this case, the data output device 156 does not wait for completion of the file output done by the file access managing section 163. The result of the file output done by the file access managing section 163 is checked by the commit processor 162.

Further, the data output device 156 starts the data communication device 152, since the data 2 is stored in the process memory 31m. Upon receiving the data 2 from the data output device 156, the data transmitting device 152 transmits the data 2 to the output-destination server 41 (S805). The data transmitting device 152 operates asynchronously, and the data output device 156 does not wait for completion of the transmission.

Then, when outputting the data 3, the data storage memory acquiring device 155 checks presence of the storage region in the shared memory 106 and the process memory 31m. The data storage memory acquiring device 155 starts the node judging device 151, judges that the server 32 as the output destination is on the node 30, and secures a region in a necessary size on the shared memory 33 (S806).

The data processor 161 stores the data 3 to the shared memory 33 secured by the data storage memory acquiring device 155 (S807). Thereafter, the data processor 161 starts the data output device 156.

Upon receiving the data 3 from the data processor 161, the data output device 156 requests the file access managing section 163 to output the data 3. The file output request is stored in the execution queue 112. The file access device 164 monitors the execution queue 112, takes out the stored request, and performs the execution asynchronously to store the data 3 in a file form to the NAS 80 (S808). The data output device 156 does not wait for completion of the file output. The result of the file output by the file access managing section 163 is checked by the commit processor 162. In this case, the data 3 is stored in the shared memory 33, so that the data communication device 152 does not perform data transmission to the server 32.

When the data processor 161 completes the processing for all the data in one-time transaction, the commit processor 162 is started. The commit processor 162 starts the file commit device 157 for each of the outputted data.

First, the file commit device 157 makes inquiry to the file access managing section 163 to check whether or not the output request of the data 2 by the data output device 156 has been completed, and waits for the completion when it has not been completed. Further, the file commit device 157 also waits for completion of transmission of the data 2 done by the data communication device 152.

When the output of the file and the transmission of the data are completed, the file commit device 157 informs the number of pieces of data, the file size, and the like as the data information to the output-destination server 41 (S809). Since the data file storing destination of the data 2 is the process memory 31$m$, the file commit device 157 releases the storage region therein (step S810).

Then, the file commit device 157 makes inquiry to the file access managing section 163 to check whether or not the output request of the data 3 has been completed, and waits for the completion when it has not been completed. When the output of the file is completed, the file commit device 157 informs the number of pieces of data, the file size, and the like as the data information to the output-destination server 32 (S811).

The commit processor 162 starts the data erasing device 158 further. The data erasing device 158 requests file erasure to the file access managing section 163 to erase the file in which the data 1 as the input is being loaded. The file access managing section 163 erases the data 1 from the NAS 80 by the file access device 164 (S812). The commit erasing device 158 releases the storage region of the data 1 from the process memory 31$m$ (S813).

In the server 41, upon receiving the receiving request of the data 2 from the data communication device 152 of the node 30, the communication processor 159 starts the data receiving device 153. The data receiving device 153 secures a process memory 41$m$, and stores the received data 2 to the region secured in the process memory 41$m$. Thereafter, the communication processor 159 receives data information of the data 2 from the data communication device 152, and gives it to the input managing section 167. Upon receiving the data information, the input managing section 167 starts the data storage memory referring device 154.

The data storage memory referring device 154 starts the node judging device 151 for judging the node of the server 31 that has outputted the data 2. Upon acquiring the judgment result that the data-outputting server 31 is of another node, the data storage memory referring device 154 searches the process memory 41$m$, acquires the data stored region of the corresponding data 2, and stores the data showing the storing destination of the data 2 to that region.

The data processor 161 of the server 41 reads the reference-destination data from the process memory 41$m$ and refers to the data 2 based on the reference-destination data (S815).

Then, the data processor 161 starts the data processing on the data 2, and outputs data 4 in a process of executing the data processing.

Specifically, the data processor 161 starts the data storage memory acquiring device 155 based on the information regarding the data 4. The data storage memory acquiring device 155 judges by the node judging device 151 that the server 32 as the output destination is on another node 30, and secures the region in the necessary size on the process memory 41$m$ (S816).

The data processor 161 stores the data 4 to the secured process memory 41$m$ (S817), and then executes the data output device 156. The data output device 156 requests output of the file to the file access managing section 163. The file output request is stored in the execution queue 112. The file access device 164 monitors the execution queue 112, takes out the stored request, and performs the execution asynchronously to store the data 4 in a file form to the NAS 80 (S818). The data output device 156 does not wait for completion of the file output. The result of the file output is checked by the commit processor 162.

Further, the data output device 156 transmits the data 4 to the output-destination server 32 by the data communication device 152, since the data 4 is stored in the process memory 41$m$ (S819). The data transmitting device 152 operates asynchronously, and the data output device 156 does not wait for completion of the transmission.

When the data processor 161 completes the processing for all the data 2 in one-time transaction, the commit processor 162 starts the file commit device 157 for the outputted data 4. The file commit device 157 makes inquiry to the file access managing section 163 to check whether or not the output request of the data 4 by the data output device 156 has been completed, and waits for the completion when it has not been completed. Further, the file commit device 157 also waits for completion of transmission of the data 4 done by the data communication device 152.

When the output of the file and the transmission of the data are completed, the file commit device 157 informs the number of pieces of data, the file size, and the like as the data information to the output-destination server 32 (S820). Since the data file storing destination of the data 4 is the process memory 41$m$, the file commit device 157 releases the storage region therein (step S821).

The commit processor 162 starts the data erasing device 158 further. The data erasing device 158 requests file erasure to the file access managing section 163 to erase the file in which the data 2 as the input is being stored (S822). The data erasing device 158 releases the region of the process memory 41$m$ where the data 2 is stored.

In the server 32, the communication processor 159 receives the data information regarding the data 3 from the server 31 (S811), and the input data managing section 167 starts the data storage memory referring device 154. The data storage memory referring device 154 checks that the data 3 corresponding to the data information is stored in the shared memory 33, and acquires that region.

Further, the communication processor 159 of the server 32 receives the receiving request of the data 4. The data receiving device 153 secures a region of the process memory 32$m$ (S824), and stores the received data 4 to the secured region of the process memory 32$m$ (S825). Thereafter, the communication processor 159 receives data information of the data 4, and the input managing section 167 starts the data storage memory referring device 154. The data storage memory referring device 154 checks that the data 4 corresponding to the data information is stored in the process memory 105, and acquires that region.

The data processor 161 of the server 32 starts the data processing on the data 3 and the data 4 (S826, S827), and outputs data 5 in a process of executing the data processing.

Specifically, the data processor 161 acquires a memory for the data 5 by the data storage memory acquiring device 155. The data storage memory acquiring device 155 judges by the node judging device 151 that the server 31 as the output destination is on the same node 30, and secures the region in the necessary size on the shared memory 33 (S828).

The data processor 161 stores the data 5 to the secured shared memory 33 (S829), and then starts the data output device 156. The data output device 156 requests output of the file to the file access managing section 163. The file access managing section 163 stores the file output request in the execution queue. The file access device 164 monitors the execution queue 112, takes out the stored request, and performs the execution asynchronously to write the data 5 in a file form to the NAS 80 (S830). The data output device 156 does not wait for completion of the file output. The result of the file output is checked by the commit processor 162.

Further, the data output device 156 transmits the data 4 to the output-destination server 31 by the data communication device 152, since the data 4 is stored in the process memory 32m. The data transmitting device 152 operates asynchronously, and the data output device 156 does not wait for completion of the transmission.

When the data processor 161 of the server 32 completes the processing for all the data 3 and data 4 in one-time transaction, the commit processor 162 starts the file commit device 157 for the outputted data 5. The file commit device 157 makes inquiry to the file access managing section 163 to check whether or not the output request of the data 5 by the data output device has been completed, and waits for the completion when it has not been completed.

Further, when the output of the file has been completed, the file commit device 157 informs the number of pieces of data, the file size, and the like as the data information to the output-destination server 31 (S830).

The commit processor 162 starts the data erasing device 158 further. The data erasing device 158 requests file erasure to the file access managing section 163 to erase the files in which the data 3 and the data 4 as the input are being stored. The file access managing section 163 erases the data 3 and the data 4 from the NAS 80 by the file access device 164 (S832, S834). Further, the file access device 164 releases the region of the process memory 32m where the data 2 is stored (S833). Furthermore, the data erasing device 158 releases the region of the process memory 105 (S825).

As is clear from the explanations above, file reading for one file per transaction can be omitted, so that load on the disk device can be lightened. Since the information in the structure managing section is utilized, the node judging device can make judgments with the latest structure without executing any special operations even when there is a dynamic change in the structure.

Note here that it is also possible to put each of the operation steps into programs to be executed by a computer, and have them executed by the nodes 30 and 40 which are the main bodies directly executing each of the steps.

With such structure and operations, the exemplary embodiment can provide following effects.

The exemplary embodiment utilizes the shared memory 33, so that it is unnecessary to read the file from the NAS 80 when exchanging data between the server 31 and the server 32 which are on the same node. This lightens the load for the NAS 80, thereby making it possible to suppress the bottleneck of the processing generated due to reading and writing data from/to the NAS 80.

Further, with the exemplary embodiment, the node judging device judges whether the data-transmitting server or the transmission-destination server is on the same node by utilizing the structure information 171 recorded to the structure managing section 170. It is not necessary to modify the structure managing section 170 and the structure information 171 in any specific manner for the present invention. This provides such a secondary advantage that the node judging device 151 can make judgment with the latest structure without executing any special operations even when there is a dynamic change in the structure.

As an exemplary advantage according to the invention, the present invention is provided with the shared memory that is capable of exchanging data between servers belonging to a same node. With this, it is possible with the present invention to decrease the accesses to the NAS (shared storage) while keeping the reliability. This makes it possible to improve the processing speed by overcoming the bottleneck of the processing.

While the present invention has been described by referring to the specific exemplary embodiment shown in the drawings, the present invention is not limited only to the exemplary embodiment shown in the drawings. It is possible to employ any known structures, as long as the effect of the present invention can be achieved therewith.

INDUSTRIAL APPLICABILITY

The present invention can be broadly utilized for multistage online transaction systems.

What is claimed is:

1. A multistage online transaction system in which a plurality of nodes including servers for processing input data are connected mutually with at least one NAS (shared storage) shared among the plurality of nodes via a network, wherein
at least one of the nodes comprises a shared memory from/to which each of the servers belonging to a same node can read and write data, and
each of at least two of the servers belonging to the node having the shared memory comprises: a node judging device which judges whether or not output destination of output data acquired by processing the input data is a server belonging to the same node as that of the server itself; a data storage memory acquiring device which secures a storage region of the output data on the shared memory when the output destination is the server belonging to the same node; and a data processor which processes the input data and stores the output data to the storage region.

2. The multistage online transaction system as claimed in claim 1, wherein
each of the servers comprises a data storage memory referring device which acquires the data stored in the shared memory, when the output destination is the server belonging to the same node.

3. The multistage online transaction system as claimed in claim 1, wherein
each of the servers comprises: a process memory from/to which data cannot be read and written by the other servers; a data transmitting device which outputs data to other servers; and a data output device which outputs the output data to the process memory when the output destination is not the server belonging to the same node and, in parallel to this, executes a file access device to output the output data to the NAS.

4. The multistage online transaction system as claimed in claim 3, wherein
each of the servers comprises a file commit device which transmits, to the output-destination server, data information containing information regarding file position and size of the data after waiting for completion of the output of a file to the NAS done by the file access device.

5. The multistage online transaction system as claimed in claim 3, wherein
each of the servers comprises a data erasing device which issues an erasing request of the input data to the NAS and, in parallel to this, releases the storage region of the shared memory or the process memory where the input data is stored.

6. The multistage online transaction system as claimed in claim 1, wherein
the data storage memory acquiring device includes a function of securing a storage region on the process memory for storing the output data, when a storage region of the output data cannot be secured on the shared memory.

7. A server connected mutually with at least one NAS (shared storage) which is shared among a plurality of nodes via a network, comprising:
a data processor which is capable of generating output data by processing input data and outputting the output data to a shared memory from/to which each of computers belonging to a same node read and write data; a node judging device which judges whether or not output destination of the output data acquired by processing the input data is a server belonging to the same node as that of the server itself; and a data storage memory acquiring device which secures a storage region of the output data on the shared memory when the output destination is the server belonging to the same node, wherein
the data processor stores the output data to the storage region.

8. A transaction processing method for outputting output data by processing input data with a multistage online transaction system in which a plurality of nodes including a plurality of servers and a shared memory from/to which each of the servers can read and write data are mutually connected with at least one NAS (shared storage) shared among the plurality of nodes via a network, the method comprising:
generating the output data by processing the input data by using a data processor;
judging whether or not output destination of the output data is a server belonging to the same node by using a node judging device;
securing a storage region of the output data on the shared memory by using a data storage memory acquiring device, when the output destination is the server belonging to the same node; and
storing the output data to the storage region by using the data processor.

9. A non-transitory computer readable recording medium storing a transaction processing program used in a multistage online transaction system in which a plurality of nodes including a plurality of servers and a shared memory from/to which each of the servers can read and write data are mutually connected with at least one NAS (shared storage) shared among the plurality of nodes via a network, the program causing a computer provided to each of the nodes to execute:
a function of generating the output data by processing the input data;
a function of judging whether or not output destination of the output data is a server belonging to the same node;
a function of securing a storage region of the output data on the shared memory, when the output destination is the server belonging to the same node; and
storing the output data to the storage region.

10. A multistage online transaction system in which a plurality of nodes including servers for processing input data are connected mutually with at least one NAS (shared storage) shared among the plurality of nodes via a network, wherein
at least one of the nodes comprises a shared memory from/to which each of the servers belonging to a same node can read and write data, and
each of at least two of the servers belonging to the node having the shared memory comprises: node judging means for judging whether or not output destination of output data acquired by processing the input data is a server belonging to the same node as that of the server itself; data storage memory acquiring means for securing a storage region of the output data on the shared memory when the output destination is the server belonging to the same node; and data processing means for processing the input data and stores the output data to the storage region.

* * * * *